Nov. 29, 1938.　　R. K. GIOVANNOLI　　2,138,030
MEANS FOR ACTUATING AN AIRPLANE RETRACTABLE LANDING GEAR
Filed Nov. 10, 1937　　2 Sheets-Sheet 1

INVENTOR
ROBERT K. GIOVANNOLI Dec'd.
By HARRY GIOVANNOLI, EXECUTOR
ATTORNEYS

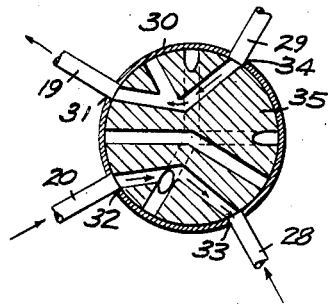
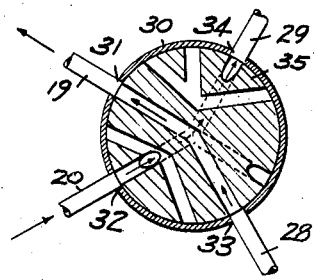
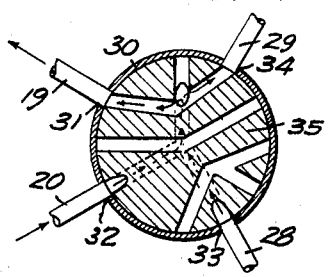
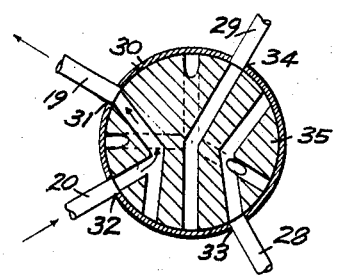
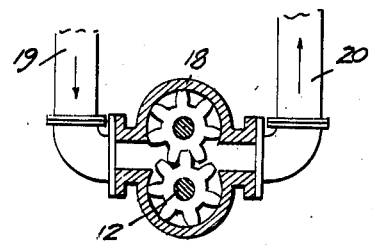

Patented Nov. 29, 1938

2,138,030

UNITED STATES PATENT OFFICE 2,138,030

MEANS FOR ACTUATING AN AIRPLANE RETRACTABLE LANDING GEAR

Robert K. Giovannoli, deceased, late of Lexington, Ky., by Harry Giovannoli, executor, Lexington, Ky.

Application November 10, 1937, Serial No. 173,844

10 Claims. (Cl. 244—102)

(Granted under the act of March 3, 1883, as amended April 30, 1928; 370 O. G. 757)

The invention described herein may be manufactured and used by or for the Government for governmental purposes, without the payment of any royalty thereon.

This invention relates to improvements in retractable airplane landing gear and the objects of the improvements are, first, to use the energy possessed by rotating airplane wheels to operate devices on the airplane and, second, to provide a means for using this energy to operate the landing gear retracting mechanism of an airplane.

To this end the invention consists in the novel construction, arrangement, and combination of parts hereinafter described in detail, with reference to the accompanying drawings, wherein.

Figures 3 to 6 inclusive are schematic views of the control cock unit of the invention, and Figure 7 is a detail view, partly in section, of the pump which forms a unit of the device.

The wheels of an airplane landing gear when rotating possess kinetic energy which may be utilized in the performance of useful work such as the operation of the landing gear retracting mechanism or other devices on the airplane. Rotation of the wheels can be started or maintained while the airplane is in flight by aerodynamic forces exerted on quarterspherical anemometer type cups attached to the tire or wheel. Such cups have already been developed and used for the purpose of starting rotation of the wheels before contact is made with the ground when landing. In the present invention, the wheel is connected with a fluid pump and the energy transmitted to the desired location by an hydraulic system.

Figure 1:
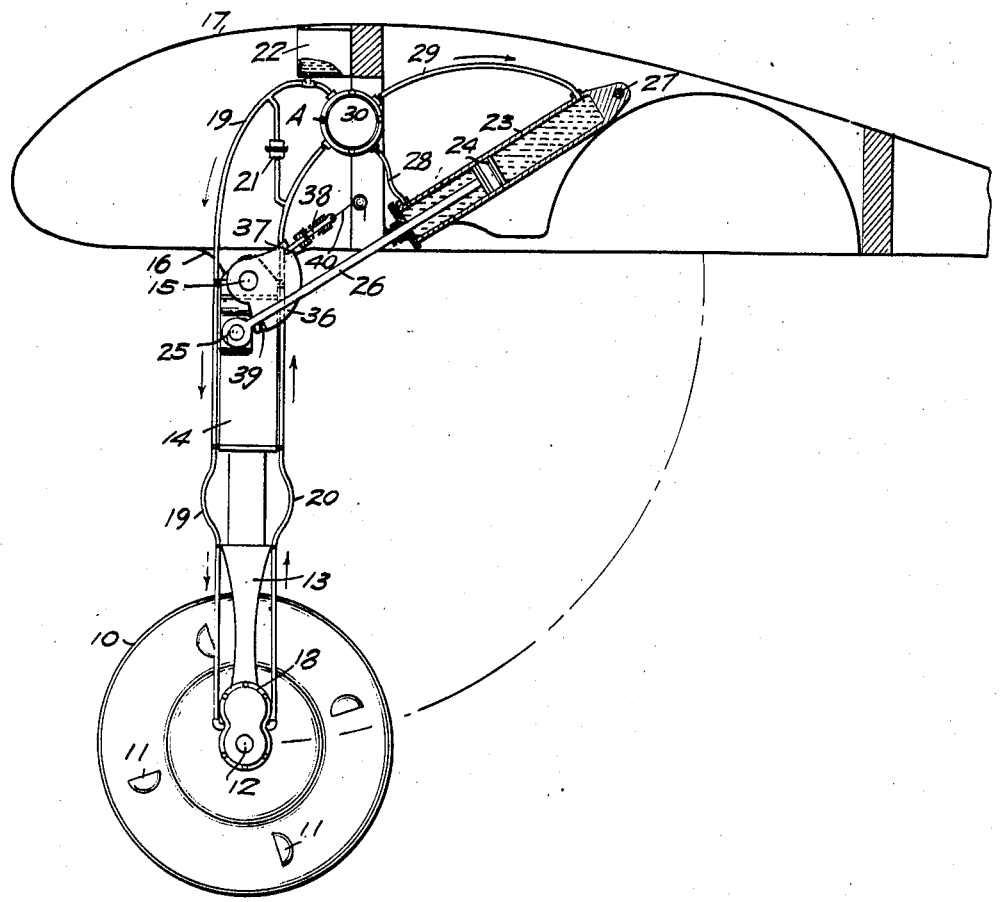
Figure 1 is a schematic side view of the invention embodied in a retractable landing gear mechanism; the landing gear being shown in extended position.
Figure 2:
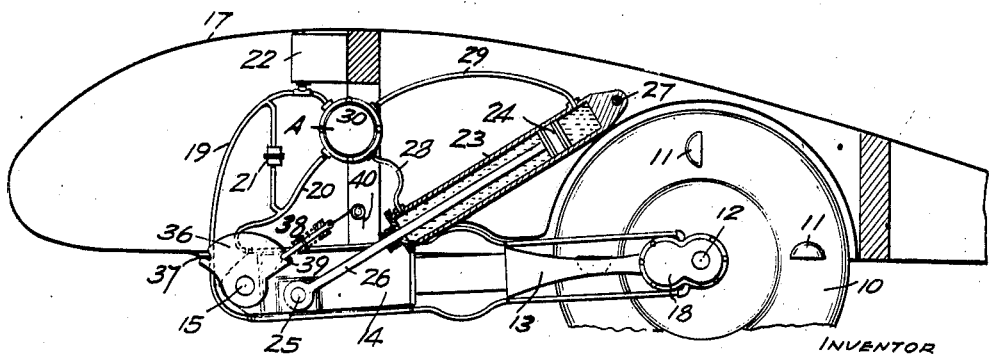
Figure 2 is a similar view of the invention with the landing gear in retracted position.

A practical embodiment of the invention in a system in which the energy of a landing wheel is used to operate the landing gear retracting mechanism of an airplane having a low thick wing is illustrated in Figures 1 and 2. The wheel 10 having cups 11 is mounted for rotation about the axle 12 within a wheel fork 13 which forms an integral part of the lower end of the landing gear strut 14. The strut is free to turn about an axis 15 at its upper end which is pivotally connected with a bracket 16 on the underside of the wing 17. Directly connected with and driven by the wheel in any suitable and convenient manner is a gear type liquid pump 18. Flexible inlet and outlet pipes 19 and 20 connect the pump with a control cock A and a spring loaded bypass valve 21 is connected between the pipes 19 and 20. A reservoir 22 is connected to the inlet pipe 19. Mounted within the wing 17 and obliquely disposed with respect to the landing gear strut 14 is a cylinder 23 containing a piston 24 the motion of which, due to the connection 25 between the strut 14 and the piston rod 26, causes the strut to turn about its axis 15. Cylinder 23 may be so mounted as to be free to move about an axis 27 at its upper end. Flexible pipes 28 and 29 connect each end of the cylinder with the control cock A.

The control cock consists of a cylindrical housing 30 in which are four openings to which are connected the four pipes from the pump 18 and the cylinder 23. Pipe 19 to the inlet of the pumps connects with opening 31; pipe 20 from the outlet of the pump connects with opening 32; pipe 28 to the lower end of the cylinder connects with opening 33; and pipe 29 to the upper end of the cylinder connects with opening 34. Inside the housing 30 is a core 35 which may be manually rotated to any desired position and which contains various passages as shown.

When the landing gear is fully extended, the control cock will be in a position, as shown in Figure 5, permitting fluid to circulate freely from and to the pump and either end of the cylinder. During flight, the rotation of the wheel will be started or maintained by the aerodynamic forces acting on the cups 11. When it is desired to retract the landing gear the operator turns the cock A to the position shown in Figure 3, whereupon fluid is directed from the outlet of the pump to the lower end of the cylinder and forces the piston 24 upward; the fluid in the upper end of the cylinder flowing back through the control cock to the inlet side of the pump. As the piston 24 is forced upward the landing gear strut 14 is turned about the axis 15 bringing the wheel 10 up into the retracted position in the wing. If the piston reaches the limit of its upward travel before all the energy of the wheel is expended, the pressure of the fluid from the pump will be kept within a safe limit by the spring loaded by-pass valve 21. If the energy of the wheel is expended before the landing gear is completely retracted the operator will turn the control cock A to the position shown in Figure 6. In this position of the control cock, the fluid is permitted to circulate freely to and from the pump but no circulation of the fluid in the cylinder 23 is permitted. Thus, the wheel will be free to turn and rotation thereof will again be started by aerodynamic force on the cups 11, while the strut 14 and the wheel 10 will be retained in the partly retracted position by the fluid in the cylinder 23. When the rotation of the wheel has reached the desired speed the operator will again turn the control cock to the position shown in Figure 3 and the raising action repeated.

A mechanical latch independent of the landing gear operating mechanism is provided to secure the landing gear in the extreme positions. This may comprise a sector 36 fixed on the upper end of the strut and concentric with the strut-axis 15. The sector has an arcuate surface indented or notched near its extremities to provide a socket 37 adapted to be engaged by a spring-pressed latch pin 38 in the extended position of the landing gear, and a socket 39 adapted to be engaged by the latch pin in the retracted position of the landing gear. The latch pin is withdrawn from engagement with the sockets by means of a pull cord 40 within convenient reach of the operator.

When it is desired to lower the landing gear, the control cock is turned to the position shown in Figure 5 and the mechanical latch released. With the control cock in this position the fluid, as previously described, will be permitted to flow freely from and to the pump and either end of the cylinder 23 and the landing gear will fall by gravity to a partly extended position in which the wheel will be exposed to the passing air and rotation thereof will again be started. The operator then turns the control cock to the position shown in Figure 4 whereupon the fluid from the pump will be directed to the upper end of the cylinder 23 forcing the piston 24 downward while the fluid from the lower end of the cylinder will flow to the inlet side of the pump. As the piston is forced downward it will turn the strut until the landing gear is in the fully extended position. The reservoir 22 will maintain the system full of fluid at all times and compensate for the varying volume of the system.

A manually operated fluid pump, not shown by the drawings, can be connected to the system to operate the retracting mechanism in the event that mud or other substance on the landing gear should increase friction to the point where the wheel could not rotate freely, or where the landing gear would fail to fall by gravity to a partly extended position.

The following calculations will show the relation between the available energy and that required for the retraction of a landing gear. The sizes and weights used correspond to those of the landing gear of the Martin B-10 bombing airplane which is considered a typical example.

Weight of rotating 40" tire and wheel assembly, $$w=110 \text{ lbs.}$$

Radius of gyration of assembly, $$k=1.06 \text{ ft. (approx.)}$$

At a tangential speed of 70 miles per hour, the rotation speed of the wheel, $$v=61.5 \text{ rad./sec.}$$

Kinetic energy available, $$=\frac{wk^2v^2}{2g}=\frac{110\times 1.124\times 3780}{2\times 32.2}=7260 \text{ ft. lbs.}$$

Total weight of retractable part of landing gear $$=212 \text{ lbs.}$$

Distance center of gravity of gear is raised during retraction $$=4 \text{ ft. (approx.)}$$

Work done in retracting gear $$=212\times 4=848 \text{ ft. lbs.}$$

This indicates that a mechanical efficiency of only, $$\frac{848}{7260}=11.69\%$$

in the system will enable it to completely retract the landing gear in a single operation.

This system furnishes a power for operation of the landing gear retracting mechanism entirely independent of the electrical system of the airplane or its engines. It may be used in conjunction with the conventional hydraulic manually operated systems, thereby relieving the crew of the labor of retracting the gear by hand while retaining the advantages of the conventional systems. The power of the system is developed without the addition of any appreciable weight to the airplane.

Having thus described the invention what is claimed is:

1. A power system for aircraft including an aircraft-carried wheel, a reversible fluid-pressure actuated device, a pump operated by rotation of the wheel and having a fluid supply and return connection with the device for supplying fluid under pressure thereto and control means in the connection between the pump and the said device operable for changing the direction of the flow of fluid to the device to reverse the operation of the latter.

2. A power system for aircraft comprising the combination with the wheel of an airplane landing gear of means responsive to aerodynamic forces exerted thereon for rotating the wheel while the aircraft is in flight, and a motor connected with and actuated by the rotation of the wheel.

3. A power system for aircraft comprising the combination with the wheels of a retractable airplane landing gear of means responsive to aerodynamic forces for positively rotating the wheels while the aircraft is in flight, and means for using the kinetic energy of the wheels to operate the landing gear retracting mechanism.

4. A power system for aircraft comprising a landing gear strut pivoted for rotation about an axis at one end and carrying a rotatable landing wheel, means on said wheel responsive to aerodynamic forces for rotating the wheel while the aircraft is in flight, a fluid-pressure motor connected with the strut for moving the latter about its axis, a pump connected with the motor and operated by the rotation of the wheel for supplying fluid under pressure to the said motor.

5. A retractable airplane landing gear comprising a retractable landing gear chassis including a wheel adapted to be rotated by aerodynamic forces while the airplane is in flight, a fluid circuit including a source of fluid energy connected to and operated by the rotation of the wheel, fluid-operated means operatively connected with the retractable chassis for extending and retracting the same and adapted to be actuated by the said source of energy, and means for placing said fluid-operated means in and out of operative connection with said fluid circuit.

6. A retractable airplane landing gear comprising a retractable landing gear chassis having a landing wheel adapted to be rotated by aerodynamic forces while the airplane is in flight, means connected with and operated by the rotation of the said wheel for providing a source of fluid energy, a reversible fluid-energy operated means connected with the retractable chassis for extending and retracting the latter energy-transmission means connecting the source of fluid energy and the fluid-energy operated means and including control means for changing the direction of transmission to reverse the action of the fluid energy operated means.

7. A retractable airplane landing gear comprising a retractable landing gear chassis having a landing wheel adapted to be rotated by aerodynamic forces while the airplane is in flight, a pump operated by the rotation of the said wheel, a cylinder, a piston in said cylinder, a connection between the piston and the chassis, a control cock, inlet and outlet pipes connecting the pump with the control cock, pipes connecting each end of the cylinder with the control cock, a spring loaded by-pass valve connected between the inlet and outlet pipes of the pump, and a reservoir connected to the inlet pipe.

8. A power system for aircraft comprising a rotatable member carried by the aircraft and adapted to be rotated by aerodynamic forces exerted thereon while the aircraft is in flight, and means carried by the aircraft for utilizing the kinetic energy of the member in the performance of useful work which comprises a fluid pressure circuit including a fluid pressure pump connected with the said member to be actuated by the rotation of the member, a second and separate fluid-pressure circuit including a cylinder and a piston in said cylinder having means of attachment to a device to be operated thereby, pilot-controlled means operable for effecting a transfer of energy from the first or pump circuit to the second circuit to cause movement of the piston in the said cylinder.

9. A retractable airplane landing gear for aircraft comprising a retractable landing gear chassis including a wheel adapted to be rotated by aerodynamic forces exerted thereon while the aircraft is in flight, and means carried by the aircraft for utilizing the kinetic energy of the wheel in extending and retracting the landing gear, said means comprising a fluid pressure pump circuit including a fluid pressure pump operatively connected with the wheel to be actuated by and upon rotation of the latter, a second fluid pressure circuit including a cylinder and a piston movable in the said cylinder and operatively connected with the said chassis for imparting its movement thereto, and a connecting conduit between the two circuits including a control cock operable to open and to close the conduit to permit and to prevent the transference of energy from the pump circuit to the other circuit.

10. A power system for aircraft comprising a rotatable member carried by the aircraft and adapted to be rotated by aerodynamic forces exerted thereon when the aircraft is in flight, and means carried by the aircraft for utilizing the kinetic energy of the said member in the performance of useful work which comprises a fluid pressure pump circuit including a fluid pressure pump operatively connected with the said member to be actuated by the rotation of the member and having separate delivery and return conduits, a second fluid pressure circuit including a cylinder and a piston in said cylinder having means of attachment to a device to be operated thereby, said cylinder having separate conduits communicating therewith at relatively opposite sides of the piston, a valve chamber in connection with and serving as a common terminal for the said conduits of the pump and cylinder, and a control valve in said chamber operable selectively to interconnect the various conduits to provide a single fluid circuit including the pump and the piston; to reverse the direction of fluid flow between the valve chamber and the cylinder; and to separate the pump circuit from the other circuit.

HARRY GIOVANNOLI,
*Executor of the Estate of Robert K. Giovannoli, Deceased.*